(12) United States Patent
Wang et al.

(10) Patent No.: US 11,305,161 B2
(45) Date of Patent: Apr. 19, 2022

(54) INTELLIGENT BALL PASSING SYSTEM

(71) Applicant: Wuyi University, Jiangmen (CN)

(72) Inventors: Tianlei Wang, Jiangmen (CN); Weitian Ni, Jiangmen (CN); Liping Xu, Jiangmen (CN); Rong Fu, Jiangmen (CN); Hongwei Yue, Jiangmen (CN); Bing Luo, Jiangmen (CN); Zhanpeng Zhao, Jiangmen (CN); Shuqing Lei, Jiangmen (CN)

(73) Assignee: Wuyi University, Jiangmen (CN)

( * ) Notice: Subject to any disclaimer, the term of this patent is extended or adjusted under 35 U.S.C. 154(b) by 180 days.

(21) Appl. No.: 16/753,008

(22) PCT Filed: Jun. 1, 2018

(86) PCT No.: PCT/CN2018/089518
§ 371 (c)(1),
(2) Date: Apr. 2, 2020

(87) PCT Pub. No.: WO2019/100685
PCT Pub. Date: May 31, 2019

(65) Prior Publication Data
US 2020/0230470 A1    Jul. 23, 2020

(30) Foreign Application Priority Data

Nov. 21, 2017 (CN) .......................... 201711172887.2

(51) Int. Cl.
*A63B 47/00* (2006.01)
*A63B 24/00* (2006.01)
(Continued)

(52) U.S. Cl.
CPC ........ *A63B 47/002* (2013.01); *A63B 24/0062* (2013.01); *A63B 47/021* (2013.01);
(Continued)

(58) Field of Classification Search
CPC . A63B 47/002; A63B 24/0062; A63B 47/021; A63B 2047/022; A63B 69/38;
(Continued)

(56) References Cited

U.S. PATENT DOCUMENTS

2001/0056000 A1* 12/2001 Hori ..................... A63B 69/002
                                                                 473/453
2007/0238555 A1* 10/2007 Fang ..................... A63B 67/04
                                                                 473/431
(Continued)

FOREIGN PATENT DOCUMENTS

CN    106422259 A    2/2017
CN    106581949 A    4/2017
(Continued)

*Primary Examiner* — Raleigh W Chiu
(74) *Attorney, Agent, or Firm* — Vivacqua Crane PLLC

(57) ABSTRACT

An intelligent ball passing system is provided, including: a ball passing robot configured for carrying out a ball passing action according to human body postures, including: a video capture device configured for acquiring human body posture data, a movement mechanism configured for driving the ball passing robot to move according to a ball passing instruction, and a central processing module connected to the movement mechanism and the video capture device respectively; and a software system configured for controlling the ball passing robot to carry out the ball passing action, the central processing module recognizing and classifying the human body postures by using the software system that uses a BP neural network.

9 Claims, 4 Drawing Sheets

(51) Int. Cl.
  *A63B 102/02* (2015.01)
  *A63B 47/02* (2006.01)
  *A63B 69/38* (2006.01)

(52) U.S. Cl.
  CPC ......... *A63B 69/38* (2013.01); *A63B 2047/022* (2013.01); *A63B 2102/02* (2015.10); *A63B 2220/05* (2013.01); *A63B 2220/806* (2013.01); *A63B 2225/50* (2013.01); *A63B 2230/62* (2013.01)

(58) Field of Classification Search
  CPC ............ A63B 2102/02; A63B 2220/05; A63B 2220/806; A63B 2225/50; A63B 2230/62
  See application file for complete search history.

(56) References Cited

U.S. PATENT DOCUMENTS

| | | | |
|---|---|---|---|
| 2014/0038751 A1* | 2/2014 | Yeager | A63B 71/0605 473/431 |
| 2016/0080614 A1 | 3/2016 | Hollinger | |
| 2020/0230470 A1* | 7/2020 | Wang | G06K 9/00342 |

FOREIGN PATENT DOCUMENTS

| | | | |
|---|---|---|---|
| CN | 106823333 | A | 6/2017 |
| CN | 206518826 | U | 9/2017 |
| CN | 206526481 | U | 9/2017 |
| CN | 107982892 | A | 5/2018 |
| KR | 20130001534 | A | 1/2013 |

* cited by examiner

INTELLIGENT BALL PASSING SYSTEM

CROSS REFERENCE TO RELATED APPLICATIONS

This application is a national stage application under 35 U.S.C. 371 of PCT Application No. PCT/CN2018/089518, filed on 1 Jun. 2018, which PCT application claimed the benefit of Chinese Patent Application No. 2017111728872, filed on 21 Nov. 2017, the entire disclosures of which are hereby incorporated herein by reference.

TECHNICAL FIELD

The present disclosure relates to the field of auxiliary devices for tennis training, and in particular to an intelligent ball passing system.

BACKGROUND

With the development and popularization of tennis, more and more people are participating in tennis sports. The population of tennis sports in China is growing at an annual rate of about 10%. The sports population is younger and more active, and the consumer demand is higher.

Human body posture recognition is a key technology for the development of human-computer interaction. A person transmits the information to be expressed to a computer by making various postures, and the computer accurately understands the meanings of human body's actions by recognizing the human body's actions. Therefore, the human body posture recognition technology has become a research hotspot. However, there are still no fully-automatic tennis ball passing products based on human body posture recognition in the market, and the ball passing operation is performed manually, resulting in a related gap in the market. In order to fill the intelligent tennis ball passing gap in the market, there is a more and more urgent need for products of ball passing systems based on human body posture recognition.

SUMMARY

In order to solve the above problems, an objective of the present disclosure is to provide an intelligent ball passing system, which can realize autonomous ball passing without any direct manual operation, thereby eliminating the need for a user to take balls at a rest area or a designated place.

The technical solutions for the above problems according to the disclosure are provided as follows.

There is provided an intelligent ball passing system, including: a ball passing robot configured for carrying out a ball passing action according to human body postures, including: a video capture device configured for acquiring human body posture data, a movement mechanism configured for driving the ball passing robot to move according to a ball passing instruction, and a central processing module connected to the movement mechanism and the video capture device respectively; and a software system configured for controlling the ball passing robot to carry out the ball passing action, the central processing module recognizing and classifying the human body postures by using the software system that uses a BP neural network.

Further, recognizing and classifying the human body postures by using the software system that uses a BP neural network includes the following steps.

Step A, acquiring, by the video capture device, a posture picture corresponding to the human body posture data;

Step B, performing human body separation on the posture picture by using an OPENCV library to obtain a separated picture;

Step C, determining whether the separated picture corresponds to a human body, binarizing the separated picture and outputting a binarized image if the separated picture corresponds to a human body, and stopping recognition and classification operation if the separated picture does not correspond to a human body;

Step D, training the BP neural network, inputting the binarized image into the trained BP neural network, and extracting a human body posture feature value; and Step E, recognizing and classifying the human body posture feature value, driving, by the movement mechanism, the ball passing robot to move and pass a ball if the human body posture feature value corresponds to a ball passing instruction, and having the ball passing robot standby if the human body posture feature value does not correspond to a ball passing instruction.

Further, in Step B, during human body separation from the posture picture by using the OPENCV library, the human body is separated out from the posture picture by Gaussian background modeling.

Further, the movement mechanism includes wheels and a motor for driving the wheels, and the wheels are arranged on the bottom of the ball passing robot.

Further, the ball passing robot further includes an obstacle avoidance sensor configured for providing the ball passing robot with obstacle conditions in front thereof and connected to the central processing module.

Further, the ball passing robot further includes a wireless communication module configured for the ball passing robot to communicate with an external terminal and connected to the central processing module.

Further, the ball passing robot further includes a lithium battery pack configured for providing the ball passing robot with an operating power source.

Further, the central processing module is composed of a processing chip S5P6816 and a peripheral circuit thereof.

Further, the video capture device is a camera.

The present disclosure has the following beneficial effects. In the intelligent ball passing system, the video capture device captures a certain number of posture pictures by shooting human body postures and transmits the posture pictures to the central processing module. The central processing module analyzes and processes the posture pictures by using the software system, so as to recognize and classify the human body postures. When a recognized human body posture satisfies the requirements of a ball passing instruction, the central processing module controls the movement mechanism to drive the ball passing robot to carry a ball and move toward a user, thereby eliminating the need for the user to take balls at a rest area or a designated place. Therefore, under the drive of the software system, the ball passing robot can provide accurate ball passing service according to the corresponding posture made by the user, and can thus realize autonomous ball passing without any direct manual operation, thereby eliminating the need for the user to take balls at a rest area or a designated place.

BRIEF DESCRIPTION OF THE DRAWINGS

The present disclosure will be further described below by embodiments with reference to the accompanying drawings.

DETAILED DESCRIPTION

Figure 1:
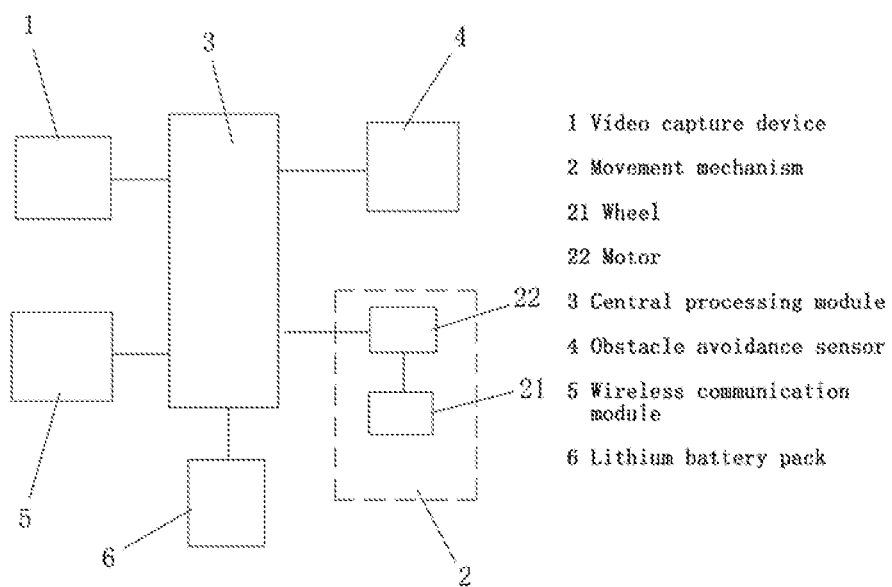
FIG. 1 is a principle diagram of an intelligent ball passing system according to the present disclosure.

With reference to FIGS. 1-4, there is provided in the disclosure an intelligent ball passing system, including a ball passing robot configured for carrying out a ball passing action according to human body postures, and a software system configured for controlling the ball passing robot to carry out the ball passing action. The ball passing robot includes a video capture device 1 configured for acquiring human body posture data, a movement mechanism 2 configured for driving the ball passing robot to move according to a ball passing instruction, and a central processing module 3 configured for recognizing and classifying the human body postures by using the software system. The video capture device 1 and the movement mechanism 2 are connected to the central processing module 3, respectively. The software system recognizes and classifies the human body postures by using a BP neural network. The central processing module 3 is composed of a processing chip S5P6816 and a peripheral circuit thereof. The video capture device 1 is a camera. A lithium battery pack 6 configured for providing the ball passing robot with an operating power source is further provided in the ball passing robot. Specifically, the video capture device 1 captures a certain number of posture pictures by shooting human body postures and transmitting the posture pictures to the central processing module 3. The central processing module 3 analyzes and processes the posture pictures by using the software system, so as to recognize and classify the human body postures. When the recognized human body posture satisfies the requirements of a ball passing instruction, the central processing module 3 controls the movement mechanism 2 to drive the ball passing robot to carry a ball and move toward a user, thereby eliminating the need for the user to take balls at a rest area or a designated place. Therefore, under the drive of the software system, the ball passing robot can provide accurate ball passing service according to the corresponding posture made by the user, and can thus realize autonomous ball passing without any direct manual operation, thereby eliminating the need for the user to take balls at a rest area or a designated place.

With reference to FIGS. 1-4, the software system recognizes and classifies the human body postures by using a BP neural network by the following steps:

Step A, acquiring, by the video capture device 1, a posture picture corresponding to the human body posture data;

Step B, performing human body separation on the posture picture by using an OPENCV library to obtain a separated picture;

Step C, determining whether the separated picture corresponds to a human body, binarizing the separated picture and outputting a binarized image if the separated picture corresponds to a human body, and stopping the recognition and classification operation if the separated picture does not correspond to a human body;

Step D, training the BP neural network, inputting the binarized image into the trained BP neural network, and extracting a human body posture feature value; and Step E, recognizing and classifying the human body posture feature value, driving, by the movement mechanism 2, the ball passing robot to move and pass a ball if the human body posture feature value corresponds to a ball passing instruction, and having the ball passing robot standby if the human body posture feature value does not correspond to a ball passing instruction.

Figure 2:
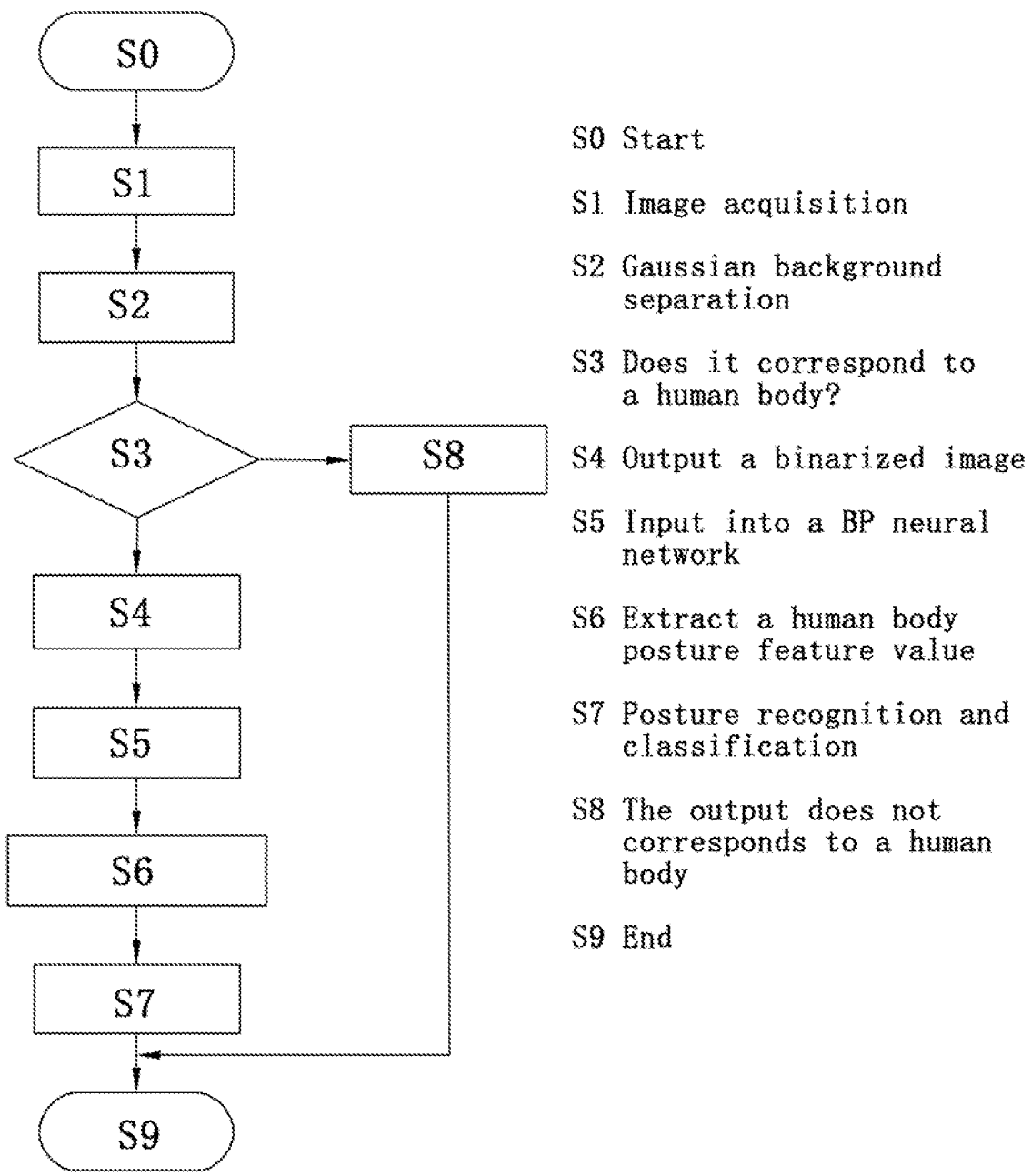
FIG. 2 is a flowchart of recognizing and classifying human body postures by a software system.

With reference to FIG. 2, in the Step B, during the human body separation from the posture picture by using the OPENCV library, the human body is separated out from the posture picture by Gaussian background modeling.

Specifically, during the operation of the ball passing robot, the central processing module 3 receives in real time posture pictures transmitted by the camera and performs human body separation on the posture pictures by using the OPENCV library. Specifically, the central processing module 3 performs Gaussian background modeling, separates the human body from the posture pictures by a background separation method to obtain separated pictures, and further distinguishes the separated pictures. If it is determined that the separated picture corresponds to a human body, the separated picture is binarized, and a binarized image is output. The binarized image is input into the BP neural network. Feature extraction is performed on the binarized image by using the trained BP neural network, to obtain a human body posture feature value. Finally, the type of the posture is determined according to the result output by a transfer function.

Figure 3:
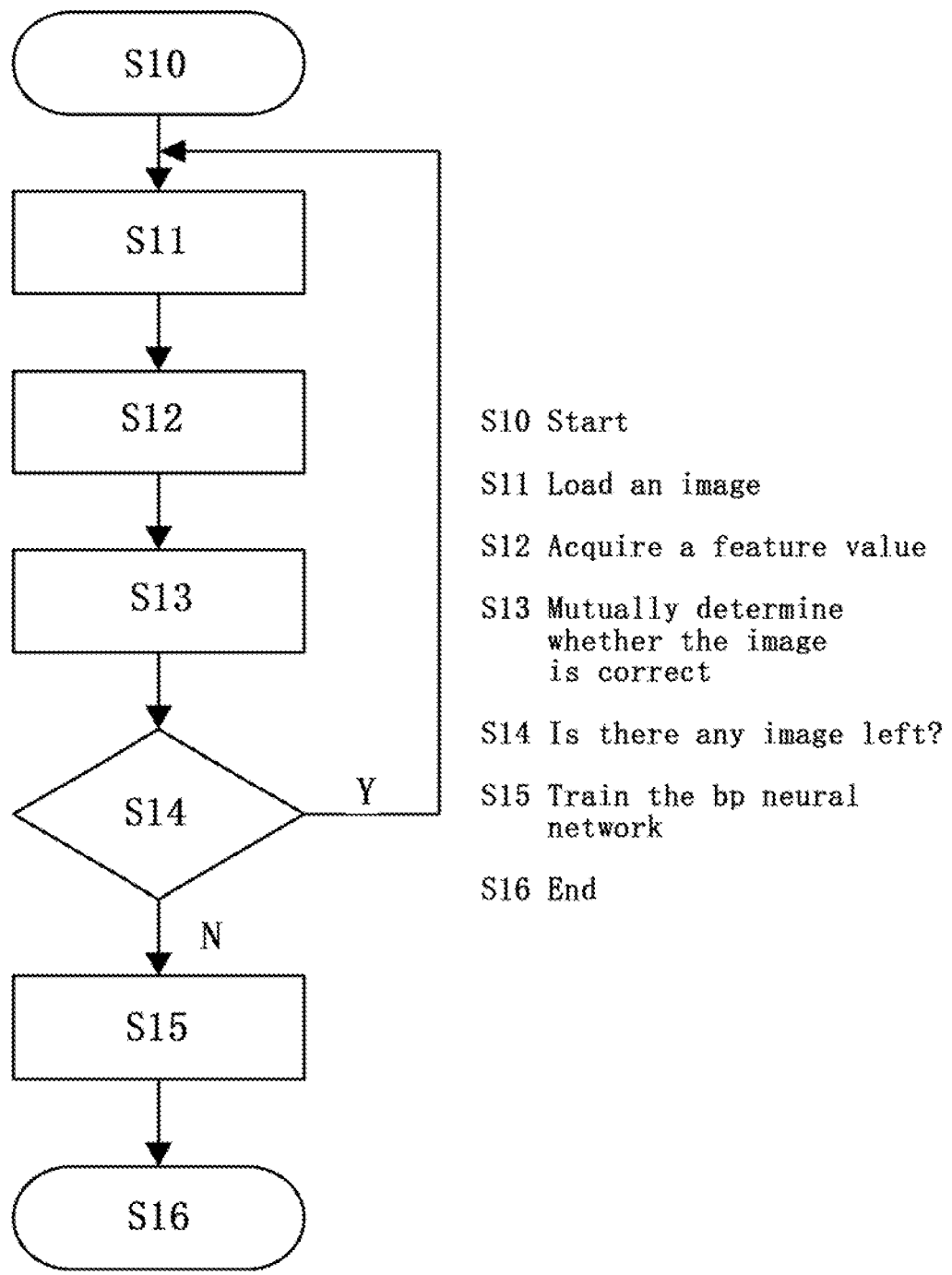
FIG. 3 is a flowchart of training a BP neural network.
Figure 4:
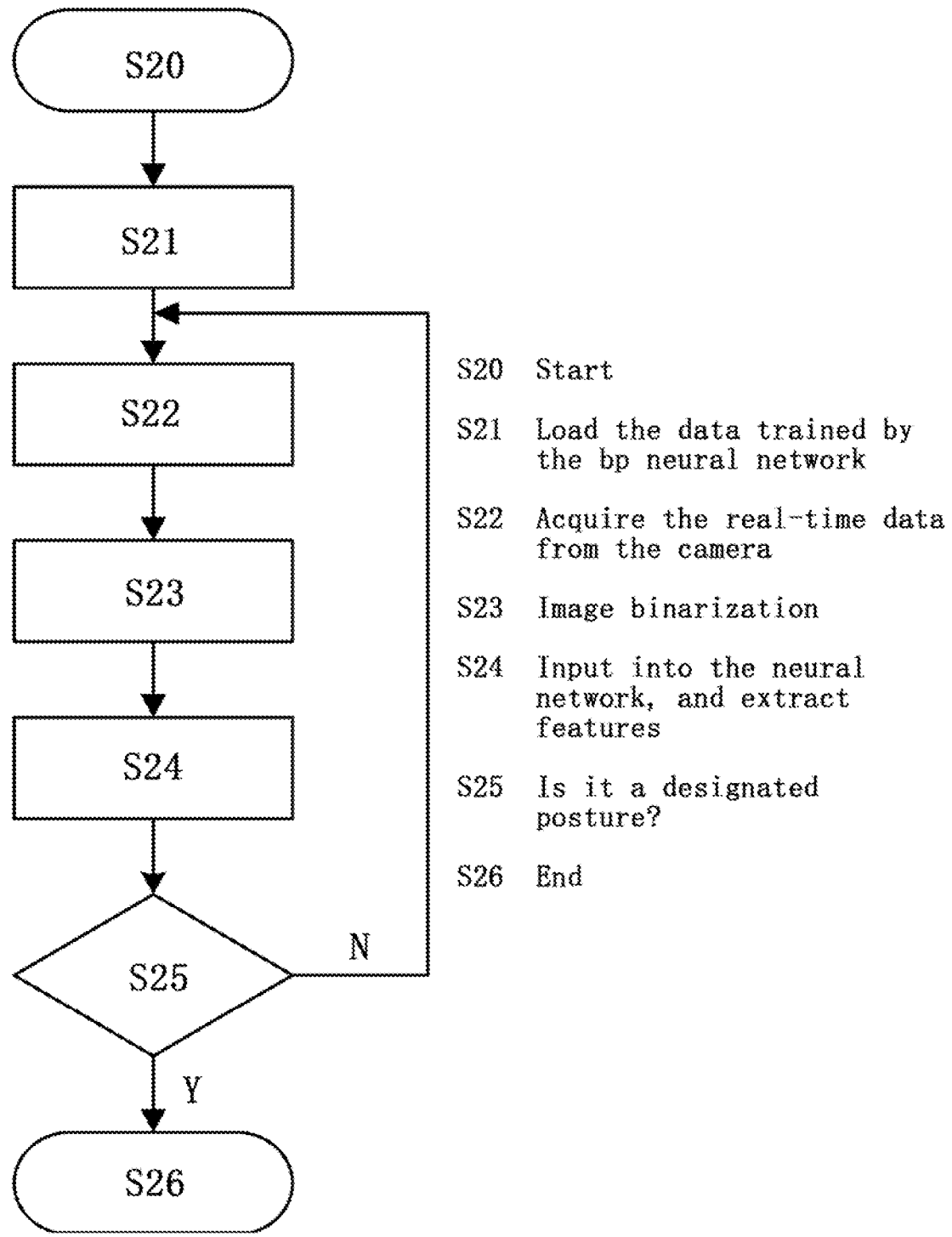
FIG. 4 is a flowchart of the use of the BP neural network.

With reference to FIGS. 2-4, before the human body posture is recognized and classified by the BP neural network, the BP neural network needs to be trained. Firstly, the camera acquires a certain number of posture pictures as sample pictures for training the BP neural network. Then, the number of neuron nodes in input layers and output layers, the number of neuron nodes in hidden layers, a transfer function, a learning rate and other parameters in the BP neural network are determined by a trail-and-error method. Finally, the sample pictures are input into the BP neural network for training. Specifically, in the process of training the BP neural network, it is necessary to set the parameters of the BP neural network. For example, five input layers, three hidden layers and an output layer are selected, wherein each layer has two perceptrons; sigmoid is selected as an excitation function; and a back-propagation algorithm is used. After an end condition has been set, a certain number of posture pictures acquired by the camera are binarized, and the binarized posture pictures are used as sample pictures (including correct postures and wrong postures) for training the BP neural network. The more sample pictures are used for training, the more accurate the trained BP neural network recognition will be, but the training time will be longer. Therefore, for each sample picture, the feature of the image is extracted, and it is manually determined whether the current image is a correct posture. After all the sample pictures are manually confirmed, the sample pictures with correct postures are input into the BP neural network for training, so that the time required for training can be greatly saved. After the BP neural network has been trained, and when it is necessary to recognize and classify human body postures by using the BP neural network, the data of the trained BP neural network is firstly loaded, then real-time posture pictures acquired by the camera are read, image binarization is performed on the real-time posture pictures, and feature values of the images are extracted. Finally, the feature values of the images are input into the transfer function of the BP neural network to obtain the similarity between the real-time posture pictures and the sample pictures, and then it is determined according to the similarity whether the current real-time posture picture is a correct posture.

With reference to FIG. 1, the movement mechanism 2 includes wheels 21 and a motor 22 for driving the wheels 21. The wheels 21 are arranged on the bottom of the ball passing robot. The wheels 21 are driven by the motor 22 to move the ball passing robot toward the user and place the ball in front of the user, realizing the automatic ball passing function and eliminating the need for the user to take balls at a rest area or a designated place.

With reference to FIG. 1, the ball passing robot is further provided with an obstacle avoidance sensor 4 configured for providing the ball passing robot with obstacle conditions in front thereof. The obstacle avoidance sensor 4 is connected to the central processing module 3. Specifically, the obstacle avoidance sensor 4 is a device for detecting obstacles by ultrasonic waves or lasers. The obstacle avoidance sensor 4 can enable the ball passing robot to effectively avoid obstacles in the traveling path while traveling toward the user, so that the ball passing robot can well complete the ball passing operation.

With reference to FIG. 1, the ball passing robot is further provided with a wireless communication module 5 configured for communication of the ball passing robot with an external terminal. The wireless communication module 5 is connected to the central processing module 3. Specifically, the wireless communication module 5 may be a Bluetooth module, a WIFI module or a mobile network communication module. The wireless communication module 5 can provide the ball passing robot with an ability to perform data interaction with other terminal devices. For example, the ball passing robot can perform data interaction with an electronic device such as a smart phone or a tablet computer through the wireless communication module 5, so that it is convenient for the user to realize state monitoring and control of the ball passing robot.

Compared with the related conventional applications, the intelligent ball passing system of the present disclosure has the following advantages. The ball passing robot can realize the ball passing service as long as the user makes the corresponding correct posture. With the intelligent ball passing system of the present disclosure in combination with the ball picking-up products for tennis, the tennis ball can be fully-automatically passed to the user, so that the need for a player to take balls at a rest area or a designated place is eliminated, therefore convenience can be greatly improved. In addition, the human body recognition part in the intelligent ball passing system of the present disclosure has high compatibility and can adjust posture parameters according to actual application requirements, so that it can be effectively applied in other systems.

Although the preferred embodiments of the present disclosure have been described in detail above, the present disclosure is not limited to the embodiments. Those skilled in the art can make various equivalent variations or substitutions without departing from the concept of the present disclosure, and these equivalent variations or substitutions shall fall into the scope defined by the appended claims of the present application.

We claim:

1. An intelligent ball passing system, comprising:
   a ball passing robot configured for carrying out a ball passing action according to human body postures, comprising:
   a video capture device configured for acquiring human body posture data,
   a movement mechanism configured for driving the ball passing robot to move according to a ball passing instruction, and
   a central processing module connected to the movement mechanism and the video capture device respectively, and
   a software system configured for controlling the ball passing robot to carry out the ball passing action, the central processing module recognizing and classifying the human body postures by using the software system that uses a BP neural network.

2. The intelligent ball passing system of claim 1, wherein recognizing and classifying the human body postures by using the software system that uses a BP neural network comprises:
   A. acquiring, by the video capture device, a posture picture corresponding to the human body posture data;
   B. performing human body separation on the posture picture by using an OPENCV library to obtain a separated picture;
   C. determining whether the separated picture corresponds to a human body, binarizing the separated picture and outputting a binarized image if the separated picture corresponds to a human body, and stopping recognition and classification operation if the separated picture does not correspond to a human body;
   D. training the BP neural network, inputting the binarized image into the trained BP neural network, and extracting a human body posture feature value; and
   E. recognizing and classifying the human body posture feature value, driving, by the movement mechanism, the ball passing robot to move and pass a ball if the human body posture feature value corresponds to a ball passing instruction, and having the ball passing robot standby if the human body posture feature value does not correspond to a ball passing instruction.

3. The intelligent ball passing system of claim 2, wherein, in step B, during human body separation from the posture picture by using the OPENCV library, the human body is separated out from the posture picture by Gaussian background modeling.

4. The intelligent ball passing system of claim 1, wherein the movement mechanism comprises wheels and a motor for driving the wheels, and the wheels are arranged on the bottom of the ball passing robot.

5. The intelligent ball passing system of claim 1, wherein the ball passing robot further comprises an obstacle avoidance sensor configured for providing the ball passing robot with obstacle conditions in front thereof and connected to the central processing module.

6. The intelligent ball passing system of claim 1, wherein the ball passing robot further comprises a wireless communication module configured for the ball passing robot to communicate with an external terminal and connected to the central processing module.

7. The intelligent ball passing system of claim 1, wherein the ball passing robot further comprises a lithium battery pack configured for providing the ball passing robot with an operating power source.

8. The intelligent ball passing system of claim 1, wherein the central processing module is composed of a processing chip S5P6816 and a peripheral circuit thereof.

9. The intelligent ball passing system of claim 1, wherein the video capture device is a camera.

* * * * *